United States Patent [19]

Berz et al.

[11] Patent Number: 4,648,770
[45] Date of Patent: Mar. 10, 1987

[54] STACKING PROFILE ELEMENTS IN NESTED GROUPS

[75] Inventors: Gerhard Berz; Hans J. Braun, both of Düsseldorf; Claus G. Schlanzke, Ratingen-Eckamp, all of Fed. Rep. of Germany

[73] Assignee: SMS Schloemann-Siemag Aktiengesellschaft, Düsseldorf, Fed. Rep. of Germany

[21] Appl. No.: 742,368

[22] Filed: Jun. 7, 1985

Related U.S. Application Data

[63] Continuation of Ser. No. 444,629, Nov. 26, 1982, abandoned.

[30] Foreign Application Priority Data

Dec. 24, 1981 [DE] Fed. Rep. of Germany ....... 3151482

[51] Int. Cl.[4] .............................................. B65G 57/18
[52] U.S. Cl. ..................................... 414/30; 198/374; 414/56; 414/74
[58] Field of Search ................... 198/374, 488; 414/30, 414/74, 56, 758, 759, 774, 733, 737

[56] References Cited

U.S. PATENT DOCUMENTS 3,957,163  5/1976  Tänzler ............................. 414/74 X
4,392,765  7/1983  Barton et al. ................... 198/374 X
4,566,833  1/1986  Gigante ................................. 414/30

FOREIGN PATENT DOCUMENTS 969200   6/1975  Canada ................................ 198/422
2106091  8/1972  Fed. Rep. of Germany .
2230715  1/1974  Fed. Rep. of Germany .
2619973  1/1977  Fed. Rep. of Germany .
2940416  4/1981  Fed. Rep. of Germany ........ 414/56

Primary Examiner—Joseph E. Valenza
Assistant Examiner—Janice Krizek
Attorney, Agent, or Firm—Karl F. Ross; Herbert Dubno

[57] ABSTRACT

Small bundles of elongated profile elements that arrive generally regularly at an intake station wherein the elements are first displaced in a transport direction generally perpendicular to their elongation direction from the intake station to a pickup station. There they are arrested in a pair of groups with the elements closely spaced in their respective groups and the groups widely spaced in the transport direction. The pair of spaced groups is then picked up without substantially changing its spacings and the pair of spaced groups is deposited in a takeoff station while further pairs of spaced groups are formed in the pickup station. These further pairs are then picked up and deposited on top of the respective groups in the takeoff station to form a pair of stacks each constituting a bundle. For nesting the elements it is possible to invert every other pair of spaced groups before depositing same in the takeoff station.

3 Claims, 2 Drawing Figures

STACKING PROFILE ELEMENTS IN NESTED GROUPS

This is a continuation of co-pending application Ser. No. 444,629 filed on Nov. 26, 1982, now abandoned.

FIELD OF THE INVENTION

The present invention relates to a method of and apparatus for stacking profile elements in nested and unnested bundles. More particularly this invention concerns such stacking for final packaging prior to shipment and use.

BACKGROUND OF THE INVENTION

Virtually all standard profile elements—such as steel studding, fence posts, angle irons, and channel—are shipped and sold in bundles. Within the bundles the shapes of the profile elements are usually exploited by nesting the elements together to reduce package volume and maximize rigidity. Automatic machinery is used to stack and package these elements, since they are bulky and produced in enormous volume for many industrial uses.

Such a stacking machine normally is at the downstream end of a conveyor that feeds the elements to it at a more or less regular rate, with the longitudinal axes of the elements horizontal and perpendicular to the transport direction. As described in German Patent No. 2,106,091 it is known to use a lifter cart and a turning magnet together to deliver turned and unturned successive groups of the elements to a vertically displaceable takeoff cart. The lifter cart drops down to push the elements it carries off onto the takeoff cart. The groups are then pushed off all together so that any gaps between them are closed up.

German Patent No. 2,230,715 describes an apparatus wherein the individual profile elements are transported by carts having combs or racks shaped to hold them in predetermined positions. Turning magnets pick them up and lay them down right side up or upside down, depending on whether they are nested or not, on the takeoff cart.

The efficiency of such a machine is established by the maximum weight it can suitably arrange on the takeoff cart and the speed it can operate with when moving this maximum weight. Obviously with a given workpiece length and cross section, the only factor that can be varied in the stacker is the width of the stack, which is a function of the number of elements handled in each group. Furthermore the machine is rated to work with up to a maximum transfer width, measured parallel to the transport direction, which corresponds roughly to the maximum weight. Thus the machine will be most efficient or productive when it is making packages that have a width equal to the maximum permissible transfer width.

Preferably each package will be a single layer of elements having a package width which is the maximum transfer width. Such a package is normally not stable so that recourse is usually had to parallelepipedal packages of square section perpendicular to the elements.

Since such a package can be very heavy and hold an unmarketably large quantity of the elements, most suppliers normally must therefore put up the bulk of their profile elements in packages that are much smaller than their stackers could productively handle. Nonetheless since such a stacking machine is essential in any large operation in such a size that it can make large rail-freight and similar packages most large suppliers have one large machine. This single large machine is used to make both large packages and small packages. Thus in a standard stacking operation the machine is greatly underutilized..

OBJECTS OF THE INVENTION

It is therefore an object of the present invention to provide an improved stacking method and apparatus for profile elements.

Another object is the provision of such a stacking method and apparatus which overcome the above-given disadvantages.

A further object is to provide an improved stacking system which allows even a large-capacity machine to work efficiently when making small packages.

SUMMARY OF THE INVENTION

These objects are attained according to the instant invention in a method of making small bundles of elongated profile elements arriving generally regularly at an intake station wherein the elements are first displaced in a transport direction generally perpendicular to their elongation direction from the intake station to a pickup station. There they are arrested in a pair of groups with the elements closely spaced in their respective groups and the groups widely spaced in the transport direction. The pair of spaced groups is then picked up without substantially changing their spacings and the pair of spaced groups is deposited in a takeoff station while further pairs of spaced groups are formed in the pickup station. These further pairs are then picked up and deposited on top of the respective groups in the takeoff station to form a pair of stacks each constituting a bundle.

With this system it is therefore possible to use the entire capacity of the stacker. Assuming for instance that the stacker is capable of making eight-wide stacks of a standard angle iron constituting the element, it is possible for it to make two or three smaller stacks, for instance two of two elements and one of three elements, so that it is still working at seven-eighths of maximum efficiency for this workpiece. A prior-art machine would not allow different groups to be handled to produce discrete stacks since at least one of the element movers would push the groups back together.

According to another feature of the invention the profile elements are all deposited facing in the same direction in the takeoff station. This is the procedure for use when the elements are not to be nested or when they nest in either direction, as do I- and H-section profile elements. For nesting the elements it is possible according to this invention to invert every other pair of spaced groups before depositing same in the takeoff station. In this manner U-, C-, or V-section elements can be fitted together to take up little more than half the volume they normally occupy.

In accordance with another feature of this invention the takeoff station is lowered an increment equal to the effective height of one of the profile elements each time a pair of spaced groups is deposited in it. This effective height is the wall thickness for the group of elements being nested together and is the overall element height when they are not being nested.

An apparatus for carrying out the method of the instant invention therefore has conveyor means for displacing the elements in a transport direction generally perpendicular to their elongation direction from the intake station to a pickup station, means including stops at the pickup station for arresting the elements in a pair of groups with the elements closely spaced in their respective groups and the groups widely spaced in the transport direction, and transfer means displaceable between the pickup station and a downstream takeoff station for picking up the pair of spaced groups in the pickup station without substantially changing their spacings and depositing the pair of spaced groups in the takeoff station. Thus further pairs of groups formed by the conveyor means and stops are deposited in the takeoff station on top of the previously deposited groups to form a pair of stacks each constituting a bundle.

The stacking apparatus can, according to more specific features of this invention, have a transfer means itself comprising a pair of transfer magnets jointly orbital about an axis between a position with the one transfer magnet facing down in the takeoff station and the other magnet facing up in an upstream transfer station and another position with the other transfer magnet facing down in the takeoff station and the one magnet facing up in the transfer station, a turning magnet pivotal upstream of the transfer magnets between a position facing down in the pickup station and a position facing up in the transfer station, and a pickup cart displaceable between a lower position in the pickup station and an upper position in the transfer station. The transfer magnets are displaceable upward through the turning magnet and pickup cart when same are in the transfer station. Thus the turning magnet can invert the elements, without changing the spacing between the groups, while displacing them from the pickup station to the transfer station. The cart can displace the bars along the same path but without inverting them. When the turning magnet acts on every other group, alternating with the cart, it is therefore possible to form very neat nested bundles of most common profiles.

It is also within the scope of this invention for the turning means to be upstream of the transfer station in an arrangement wherein the conveyor means includes a drum and a belt member having a downstream end reeved over the drum. In this case the turning means includes a second flexible conveyor member having an upstream end displaceable between a position generally level with the first-mentioned belt member and a turning position positioned down on the drum below the first belt member. When the second conveyor, usually a chain or belt, is in the turning position the elements are inverted as they pass from the first to the second belt member. When not in this position the elements pass straight from the one conveyor to the other, without inversion.

In accordance with another feature of the invention the means having the stops also includes transport means including a conveyor extending from the intake station to a transfer station for delivering the elements regularly to the transfer station, spacing means including a cart forming the pickup station and displaceable in the transport direction between an upstream position at the transfer station for receiving the elements and a downstream second transfer station, conveyor means for displacing the elements from the second transfer station to the pickup station, and control and positioning means connected to the cart for displacing same in the transport direction through small distances as the elements of one group are deposited on the cart and through a longer distance between depositions of elements of different groups of the same spaced pair. With this system the groups are formed on the cart which is advanced as it is loaded to form the pair of spaced groups. A very simple control arrangement can produce a great variety of different group setups, although ones symmetrical about a plane perpendicular to the transport direction are the only types of array that allow turning of some of the elements to nest them.

According to another feature of this invention the conveyor is a conveyor belt and the cart is constructed so the conveyor belt can pass through it when it is in the first-mentioned transfer station. In a similar manner a downstream turning magnet is made up of a group of arms that can sweep through vertically throughgoing slots in the cart to pick up the spaced groups of elements thereon.

DESCRIPTION OF THE DRAWING

The above and other features and advantages will become more readily apparent from the following, reference being made to the accompanying drawing in which.

SPECIFIC DESCRIPTION

Figure 1:
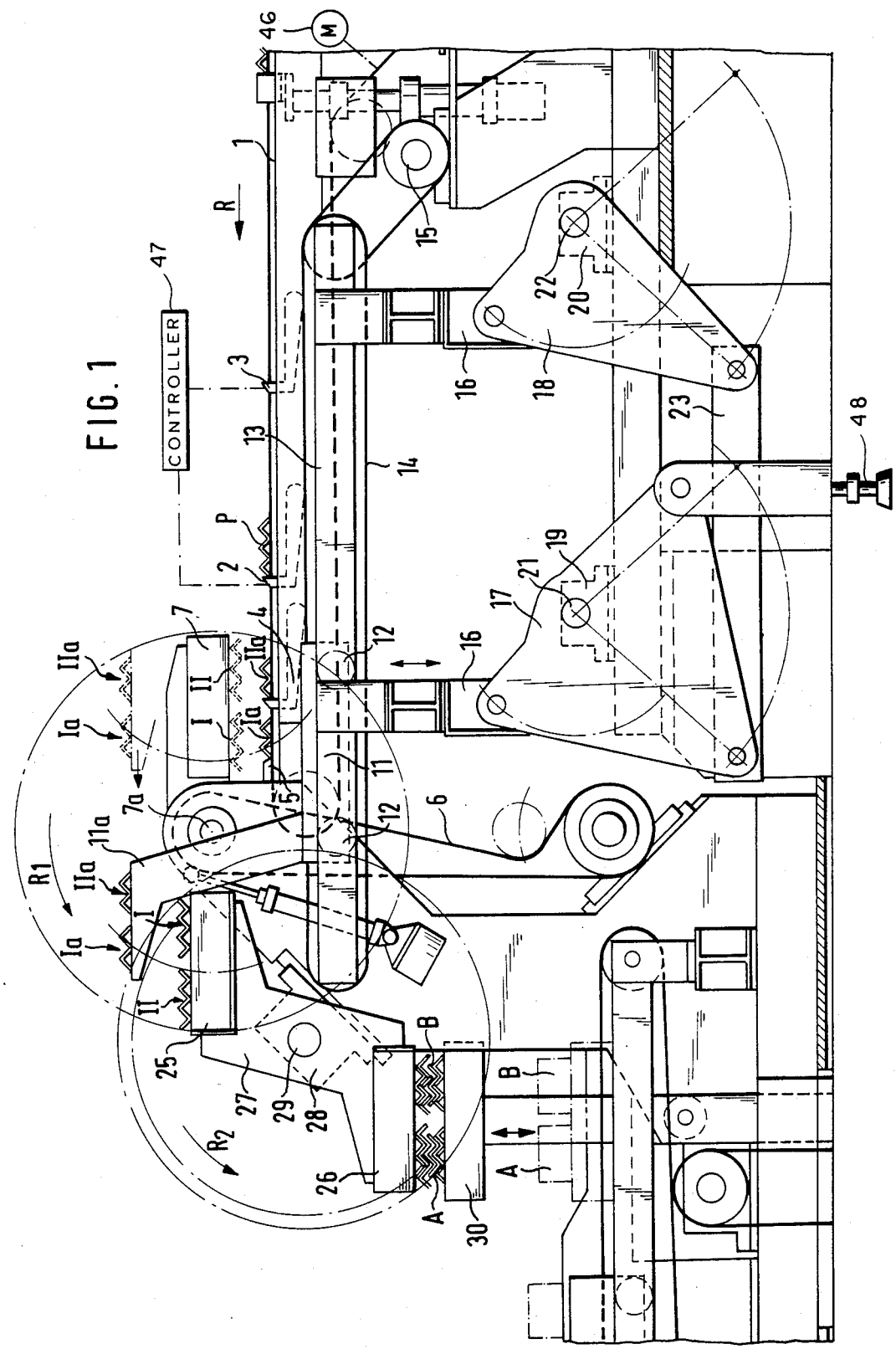
FIG. 1 is a partly schematic side view of an apparatus for carrying out the method of this invention.

As seen in FIG. 1, the apparatus according to this invention has a chain conveyor 1 driven by a motor illustrated schematically at 46 to continuously move or urge individual workpieces, here groups of angle irons P, in a direction R. Stops 2 and 3 operated like the motor 46 by a controller 47 are coupled with appropriate workpiece sensors to arrest groups of the profiles P on the chains 1. Further stops 4 and 5 provided downstream of the stops 2 and 3 define a pickup station. These stops 2–5 are pivotal between the illustrated raised positions in which they each catch the leading edge of the leading workpiece P of a group and arrest it against further movement in the direction R until a suitable number of other such profiles P back up behind it. Then the stops can pivot down to release the hitherto impeded group.

Drive means including a belt or chain 6 can pivot a multiple-arm or comb-type turning magnet 7 about its axis 7a in the direction $R_1$ between the illustrated position facing down in a takeoff station defined by the stops 4 and 5 and a diametrally offset position facing up on the other side of the axis 7a in a so-called transfer station.

A support 27 has an axle 29 supported in journals 28 and carries diametrally opposite multiple-arm or comb-type transfer magnets 25 and 26 that can interleave with and pass through the magnet 7 when the same is in the transfer station. Thus the transfer frame 27 can pivot between the illustrated position with the magnet 25 turned up in the transfer station and the magnet 26 turned down in a takeoff station defined by a vertically displaceable table 30, and a position with the magnets 25 and 26 reversed.

In addition a transfer cart 11 has arms 11a that can mesh through the magnets 7, 25, and 26 and move between a lower position immediately underneath the pickup station defined by the stops 4 and 5 to an illustrated upper position lying above the transfer station formed by the upturned surface of magnet 25 in FIG. 1. This cart 11 rides via wheels 12 on a conveyor 14 powered by a drive 15 and supported via legs 16 on sectors 17 and 18. Respective pillow blocks 19 and 20 support the axles 21 and 22 of these sectors 17 and 18 which are connected together by a link 23. Thus a common hydraulic ram 48 can vertically reciprocate the conveyor 5 14 while the motor 15 horizontally reciprocates the wagon 12 carried on it.

This apparatus operates as follows:

The profiles P arrive more or less regularly at the upstream end of the conveyor 1, all open downward. Standard sensors forming part of the controller 47 pivot the stops 1-5 up and down in such a manner that each batch of ten consecutive profiles is subdivided into first and second groups I and II of three profiles each, respectively and third and fourth groups Ia and IIa of two profiles each. In the illustrated position of the machine the turning magnet 7 has picked up two groups I and II as shown in dot-dash lines, and has moved through 180° according to arrow $R_1$ so as to position these two groups Ia and IIa above the upturned magnet 25. The magnet 7 is then cut off, that is deenergized, and the magnet 25 is simultaneously energized to receive them in the same relative position they occupied in the pickup station but upside down.

Meanwhile the next two groups Ia and IIa, which do not need turning over, are arrested in the pickup station defined by the stops 4 and 5. The cylinder 48 lifts the conveyor 14 and the motor 15 moves the car 11 across so its arms 11a lift the two groups Ia and IIa off the conveyor 1 and position them above the transfer frame 27, which meanwhile has pivoted in direction $R_2$ through 180° and demagnetized to drop the inverted groups I and II in the piles A and B.

This leaves the magnet 26 turned up in the transfer station. The arms 11a drop down through the magnet 26 which is magnetized to hold these groups Ia and IIa tight so they can be inverted and nested on top of the groups I and II underneath them.

Figure 2:
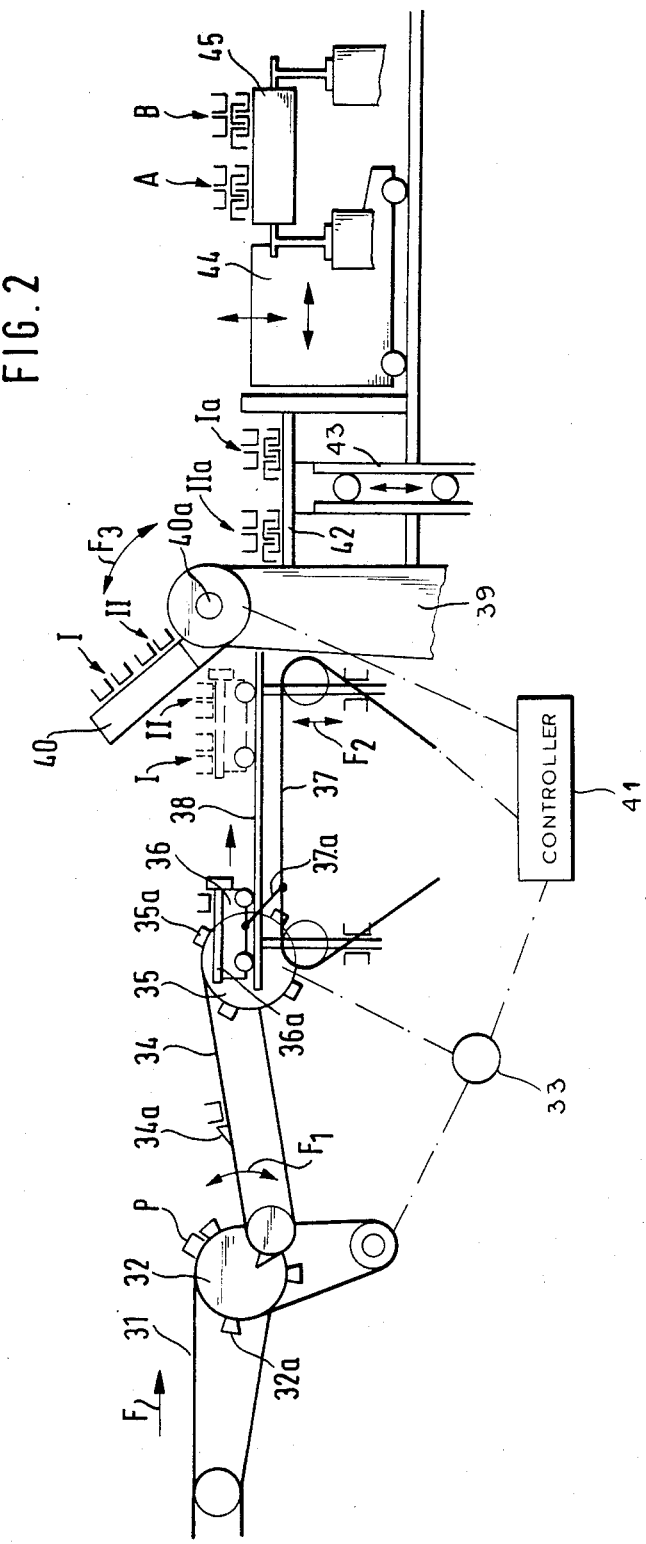
FIG. 2 is a mainly schematic view of another apparatus according to this invention.

FIG. 2 shows an arrangement wherein the profiles P, here of U-section, arrive on conveyor chains or belts 31 that are reeved at their downstream ends relative to the transport direction F over a so-called drum 32 formed by a plurality of disks. The drum 32 is provided with stops or bumps 32a angularly equispaced about its periphery. Recesses would function similarly. A common drive 33 rotates the drum 32 to advance the workpieces P. The workpieces P engage behind the stops 32a and travel down as seen in FIG. 2 through an arc of about 90°, depositing the profile element P upside down on the upstream end of conveyor belts or chains 34 spanned at their downstream ends over a transfer wheel 35. The chains 34 are provided with equispaced stops or pushers 34a that push the respective profiles P along.

The drum 35 similarly is provided with stops 35a to prevent shifting of the profiles P. Interleaving with this drum 35 in the solid-line upstream position are the rails or arms 36a of a transfer cart 36 riding on a vertically displaceable rail 38 along which it can be moved and positioned by an endless belt 37 connected to it by a link 37a. A controller 41 can step the cart in the direction F relatively short distances between depositions of elements P of the same group and a relatively large distance between groups. Groups I and II are formed in this manner.

The upstream end of the conveyor 34 can be swung up as shown by arrow $F_1$ to make the upper reaches of the conveyors 31 and 34 virtually coplanar. In this manner there will be no turning over of the elements P, which arrive opening downward. In the illustrated arrangement the conveyor 34 is oscillated to invert every other four consecutive profiles to form nested packages. It is also possible to reverse the profiles P at the first transfer station defined by the drum 35 simply by lowering the cart 36.

A multiple-arm transfer magnet 40 can sweep up through the loaded cart 36 in the dot-dash downstream position thereof. This magnet 40 has an axle 40a pivoted on a base 39 for pivoting between an upstream position facing up and picking up the elements off the cart 36 to a position facing down and depositing them on a vertically displaceable table 42 carried in a guide 43. This forms separate stacks A and B each comprising a plurality of respective groups I and II of turned elements P alternating with groups Ia and IIa of unturned elements P.

A vertically and horizontally displaceable truck 44 can engage under the stacks A and B to displace them over on top of a roller conveyor 45 from which they move off transverse to the transport direction F.

With both systems it is possible using relatively simple control technology to form several small groups of discrete elements and handle them with a large stacker so as fully to use its capacity. If the stacks to be formed are even in number and symmetrical as described above, it is possible for a large machine to nest the elements in the packages. The instant invention therefore allows high production speeds to be maintained.

We claim:

1. An apparatus for making small bundles of elongated profile elements arriving generally regularly at an intake station, said apparatus comprising:

conveyor means for displacing the elements in a transport direction generally perpendicular to their elongation direction from the intake station to a pickup station;

means including two stops at the pickup station for arresting the elements in a pair of groups with the elements closely spaced in their respective groups and the groups widely spaced in the transport direction, and other stops spaced along said conveyor means for separating said elements into said pairs of groups with the groups of successive pairs differing as to the number of elements therein; and transfer means between the pickup station and a downstream takeoff station for picking up the pairs of spaced groups in the pickup station without substantially changing their spacings and depositing the pairs of spaced groups in the pickup station whereby further pairs of groups formed by the conveyor means and stops are deposited in the takeoff station on top of the previously deposited groups to form a pair of stacks each of the pairs constituting a bundle, the transfer means including:

a pair of transfer magnets jointly orbital about an axis transverse to the direction of displacement of said conveyor means between a position with one transfer magnet facing down in the takeoff station and the other magnet facing up in an upstream transfer station and another position with the other transfer magnet facing down in the takeoff station and the one magnet facing up in the transfer station;

a turning magnet pivotal upstream of the transfer magnets between a position facing down in the pickup station and in which said turning magnet extends over both groups arrested by said two stops, and a position facing up in the transfer station; and a pickup cart displaceable between a lower position in the pickup station in which said pickup cart can lift both groups arrested by said two stops at said pickup station and an upper position in the transfer station, the transfer magnets being displaceable upward through the turning magnet and pickup cart when said turning magnet and said pickup cart are respectively in the transfer station to take up a pair of groups from the cart in their original orientations on the conveyor means alternating with takeup of a pair of groups from said turning magnet in inverted relationship to their original orientation on the conveyor means whereby said groups of elements are deposited in pairs in said bundles with alternating inversion of groups so that the successively deposited groups interfit in each bundle.

2. The bundle-making apparatus defined in claim 1 wherein the conveyor means is a conveyor belt and said cart is constructed so that said conveyor belt can pass through said cart when said cart is in said transfer station.

3. The bundle-making appparatus defined in claim 1 wherein said stops are pivotal pawls swingable through said conveyor means into engagement with said elements.

* * * * *